UNITED STATES PATENT OFFICE.

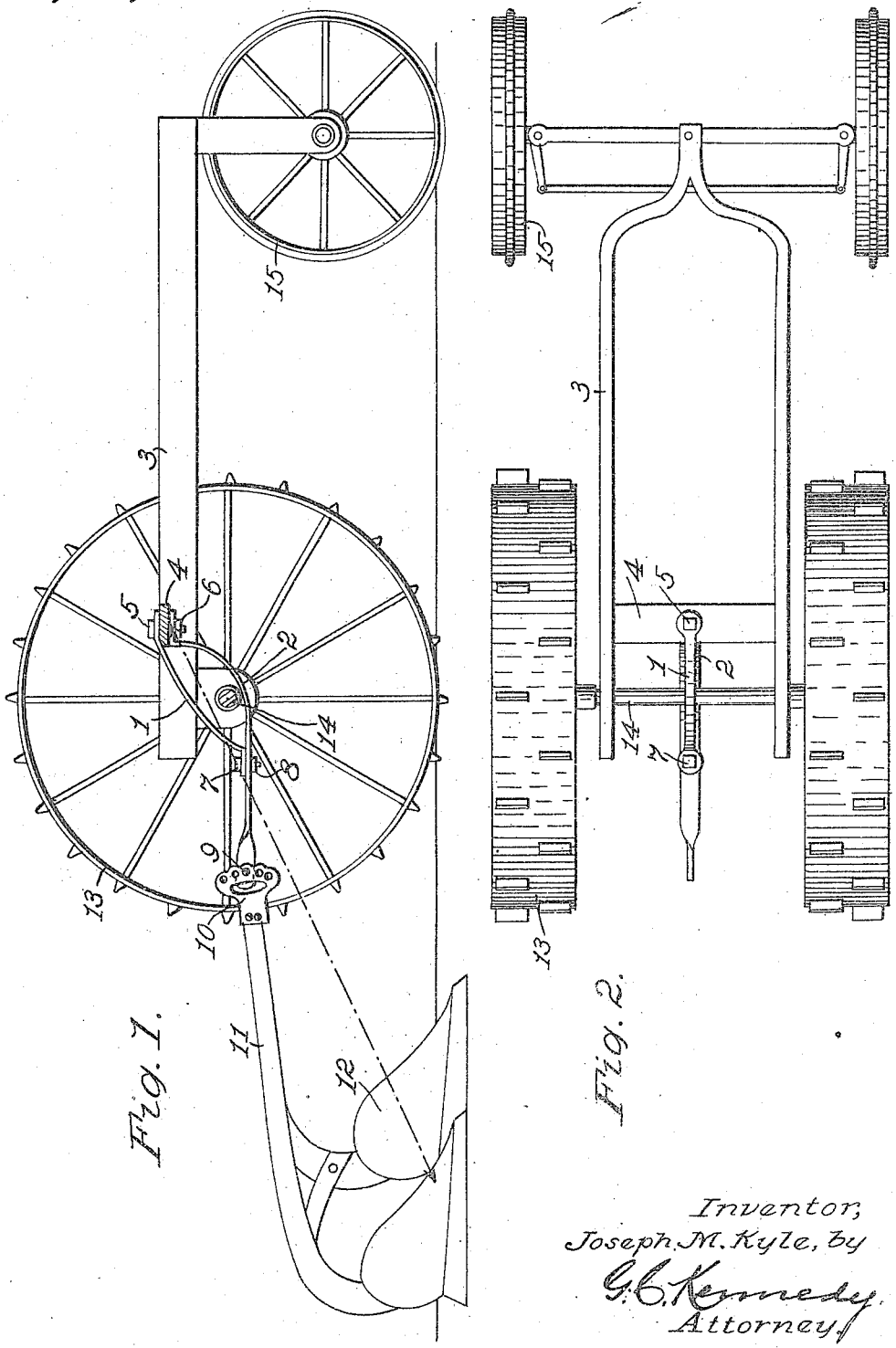

JOSEPH M. KYLE, OF BUTLER COUNTY, IOWA.

DRAFT CONNECTION FOR TRACTORS.

1,249,424.      Specification of Letters Patent.      Patented Dec. 11, 1917.

Application filed January 6, 1917. Serial No. 141,013.

*To all whom it may concern:*

Be it known that I, JOSEPH M. KYLE, a citizen of the United States of America, and a resident of Butler county, Iowa, (post-office address, R. F. D. No. 2, Bristow, Iowa,) have invented certain new and useful Improvements in Draft Connections for Tractors, of which the following is a specification.

My invention relates to improvements in draft-connections for tractors and the like, and the object of my improvement is to provide means whereby the draft of an implement hauled by a tractor may be utilized to effect a downward pressure of the traction-wheels upon the ground in addition to the gravity of the machine itself, to assure adhesion proportionate to the necessity therefor.

This object I have accomplished by the means which are hereinafter described and claimed, and which are illustrated in the accompanying drawings, in which Figure 1 is a longitudinal vertical section of a tractor equipped with my improved draft-connection, with an implement connected thereto, and the driving mechanism of the tractor removed; Fig. 2 being a plan view of the tractor parts shown in said Fig. 1.

Similar numerals of reference denote corresponding parts throughout the several views.

I have shown only the frame 3 of a tractor mounted on the pair of traction-wheels 13 and on steering-wheels 15, the driving-mechanism and other adjuncts being omitted for the sake of clearness.

The axle 14 of said traction-wheels is mounted in pendent bearings on the frame-bars. A cross-bar 4 is connected between said frame-bars at a level above and forward of the said axle, fixedly.

My improved draft-connection comprises the following parts. The numeral 2 denotes a bar pivotally connected at its forward end to a bolt passed through the cross-bar 4 and secured by means of a nut 6. This bar is curved downwardly and extends rearwardly for some distance beyond said axle, and has at its rear end a bolt-hole through which may be passed a bolt 9 for securing to the bar the clevis 10 of the beam 11 of coupled plows 12, or other implement to be hauled.

A brace-bar 1 has its forward end pivoted on the bolt 5, while its rear end is bent rearwardly over said axle and connected to the draft-bar 2 by means of a bolt 7 and nut 8.

Referring now to said Fig. 1, the oblique dotted line indicates the line of draft between the frame of the tractor and the part of the implement which enters the soil. It will be understood that the location of the draft-connection is such that the line of draft passes above the axis of the traction-wheels, and the resultant force in the direction of the axle brings a considerable pressure downwardly upon the traction-wheels, varying with the draft, which thus causes the wheels to adhere to the surface passed over with a force proportionate to the draft. When the tractor is of light weight, this feature much enhances the utility of the machine, preventing slipping of the traction-wheels in soft soil or where the implement exercises a heavy draft.

Having described my invention, what I claim as new and desire to secure by Letters Patent, is:

In a vehicle, a frame mounted on traction-wheels, said frame having a fixed cross-beam therein positioned above and forward of the axle of said traction-wheels, a bar pivotally secured to said cross-beam, bent downwardly to pass below said axle to extend to the rear thereof and having implement-engaging means at its rear end, and a brace-bar having its forward end pivotally secured to said cross-beam, bent downwardly to pass above said axle and having its rear end secured to the first-mentioned bar at a location below and to the rear of said axle.

Signed at Waterloo, Iowa, this 21st day of Dec. 1916.

JOSEPH M. KYLE.

Witnesses:
PEARL M. STANTON,
G. C. KENNEDY.

Copies of this patent may be obtained for five cents each, by addressing the "Commissioner of Patents, Washington, D. C."